March 26, 1957 W. D. FULLER 2,786,942

MULTIPLE PULSE GENERATOR

Filed Aug. 3, 1953 2 Sheets-Sheet 1

INVENTOR.
WILLIAM D. FULLER
BY
F. D. Copeland Jr.
AGENT

*INVENTOR.*
WILLIAM D. FULLER
*BY*
F. D. Copeland Jr.
AGENT

United States Patent Office 2,786,942

Patented Mar. 26, 1957

2,786,942

MULTIPLE PULSE GENERATOR

William D. Fuller, Garland, Tex., assignor to Engineering Laboratories, Inc., Garland, Tex., a corporation of Delaware Application August 3, 1953, Serial No. 372,022

1 Claim. (Cl. 250—36)

This invention relates generally to electronic circuits and more particularly to a circuit which delivers an output comprising multiple reoccurring pulses.

The primary object of this invention is to provide an electronic pulse generator in which the amplitude, pulse width, pulse spacing, repetition time between pulse groups, and the quantity of pulses in each group may be selectively varied individually.

Other objects and advantages of the invention will become apparent from the following description, and for the purposes of illustration, but not of limitation, embodiments of the invention are shown in the accompanying drawings in which.

Figure 1:
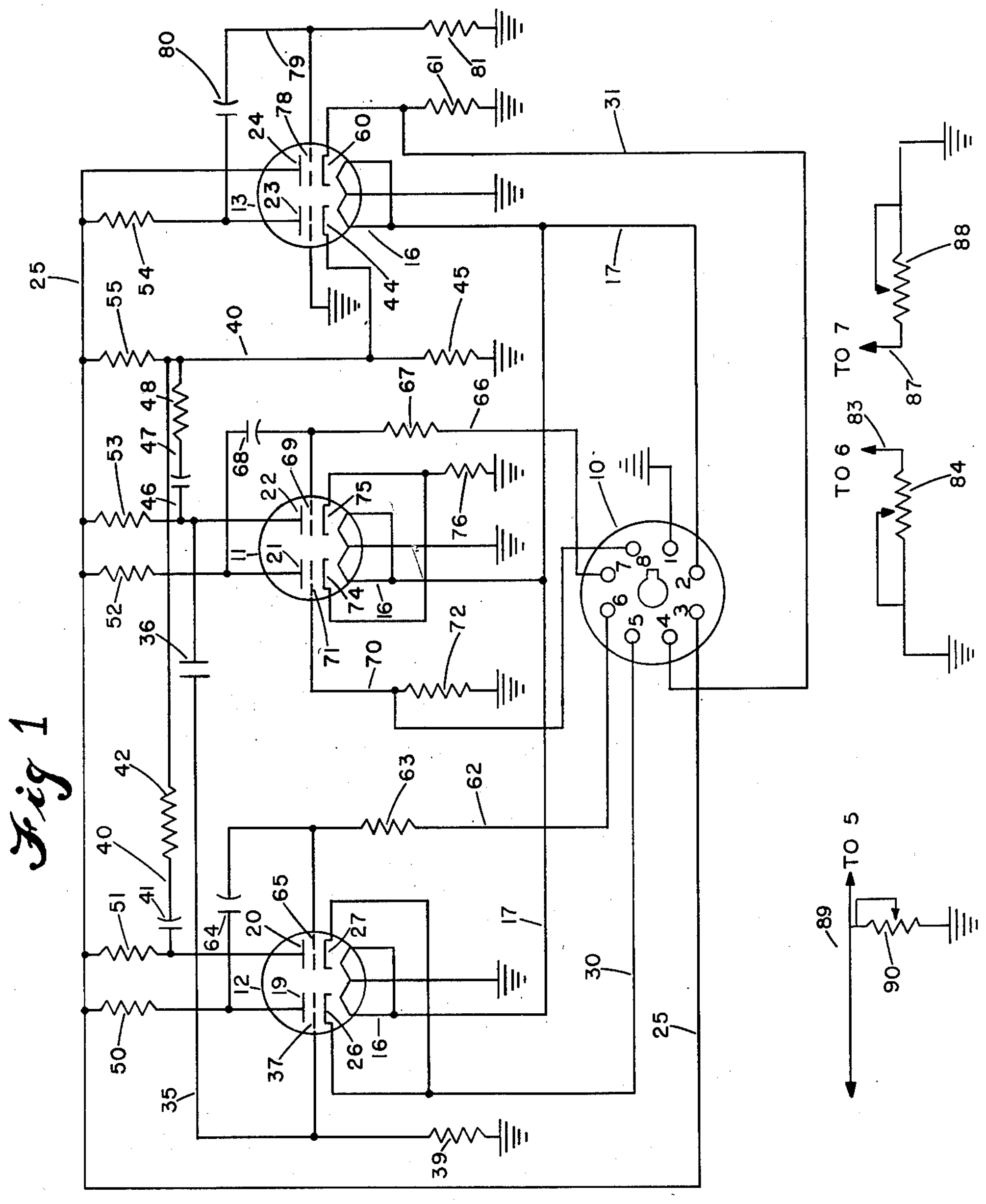
Fig. 1 represents a circuit diagram of the multiple pulse generator of this invention.

Referring now more particularly to the characters of reference of the drawing, in Fig. 1, the pins of terminal socket 10 are numbered clockwise from 1–8. The circuit attached to socket 10 on the generator side includes three double triode electron tubes 11, 12, and 13, 11 and 12 of which are each connected as a cathode coupled multi-vibrator. Tube 11 is a free-running multi-vibrator which functions as a pulse emitter; tube 12 acts as a pulse gate, and tube 13 acts as a mixer and low impedance output stage. The filaments 16 of each tube are energized through lead 17 from pin 2 of socket 10, plates 19—24 are supplied with a B voltage through lead 25 from pin 3. The frequency is controlled through external resistances, to be described more fully hereinafter, connected to pin 6 for gate tube 12, and through pin 7 for pulse tube 11. An incoming synchronizing signal from external equipment may be introduced through pin 8 to pulse tube 11. Although customary, it is not necessary that operation be synchronized with other devices. The output voltage from gate tube 12 is taken from its cathodes 26, 27 by way of lead 30 and pin 5, whereas the output voltage from mixer tube 13 and consequently the complete circuit is taken out by way of lead 31 and pin 4.

The circuit inter-connections between the various tubes include: lead 35 with capacitor 36 between grid 37 of tube 12 and plate 22 of tube 11; lead 35 is grounded through resistor 39; lead 40 including capacitor 41 and resistor 42 attaches plate 20 of tube 12 to cathode 44 of tube 13 and is subsequently grounded through resistor 45; lead 46 including capacitor 47 and resistance 48 is inserted between plate 22 and cathode 44; and B plus power supply lead 25 is connected to all plates except 24 through resistances 50—54 respectively; resistance 55 is inserted between lead 25 and lead 40.

The following resistances and capacitors are included between the terminal socket and the tubes: lead 31 between pin 4 and cathode 60 is grounded through resistor 61; lead 62 including resistor 63, and capacitor 64 connects pin 6 with plate 19 and grid 65; lead 66 including resistor 67, and capacitor 68 connects pin 7 with plate 21 and grid 69; lead 70 connects pin 8 and grid 71 and is grounded through resistor 72. Cathodes 74 and 75 of tube 11 are coupled and grounded through resistor 76. Plate 23 and grid 78 of tube 13 are coupled by lead 79 which includes capacitor 80, and is subsequently grounded through resistor 81.

The circuit 83 connected externally to pin 6 includes a variable resistor 84, and circuit 87 to pin 7 includes variable resistor 88. Circuit 89 connected externally to pin 5 includes variable resistor 90.

From an external circuit (not shown) a synchronizing signal for the frequency of pings 100 is introduced to grid 71 of multivibrator tube 11 through pin 8, whereas the ping frequency which is an integral multiple of the synchronizing signal is determined by the setting of variable resistance 88, and is connected to tube 11 through pin 7 and lead 66. The group frequency adjustment is accomplished by variable resistance 84 which is connected through pin 6 and resistor 63 to the plate 19 and grid 65 circuit of multivibrator tube 12. Gate width adjustment is accomplished by variable resistor 90 which is connected to the cathode circuit of tube 12 through pin 5.

Figure 2:
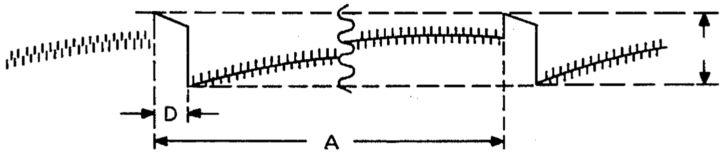
Fig. 2 represents a wave form graph taken at pin 6 of the generator terminal socket.
Figure 3:
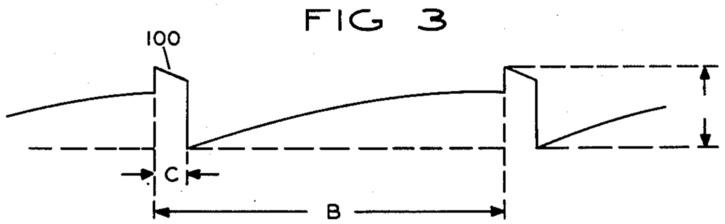
Fig. 3 is a wave form graph taken at pin 7 of the terminal socket.
Figure 4:
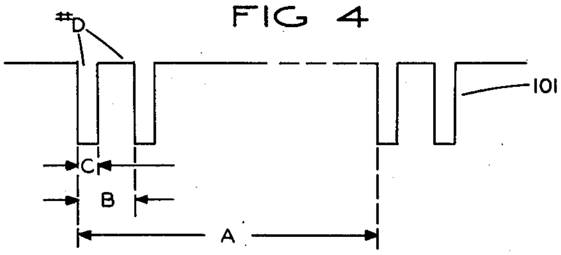
Fig. 4 is a wave form graph taken at pin 4 of the terminal socket.

In operation, with the desired group spacing setting A of Fig. 2 on variable resistance 84 and the desired ping frequency setting B of Fig. 3 on variable resistance 88, a synchronizing signal 91 introduced through pin 8 will cause multivibrator tube 11 to stay in step with the synchronizing signal and put out a continuous wave of pings 100 which in turn triggers tube 12 which generates the desired gate pulse of width A. The output of tube 11 and tube 12 are combined in mixer tube 13 to deliver an output wave form 101 which consists of that quantity of pings which occur during the width A of the gate pulse. The improved pulse generator of this invention may be used to deliver multiple pings at a desired reoccurring repetition time.

The advantage of the location of socket 10 in this circuit is that the automatic functioning elements of the circuit including tubes 11—13 may be hermetically sealed in a separate replaceable unit, whereas the manually controlled elements such as resistors 84 and 88 may be externally located so as to be accessible to an operator.

Figure 5:
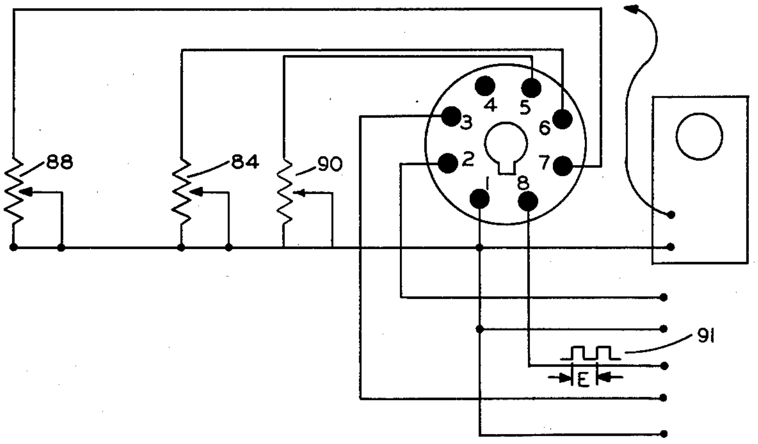
Fig. 5 represents a schematic diagram showing a method of obtaining the various wave forms and thus testing the generator circuit.

In the test circuit of Fig. 5, corresponding numbers identify corresponding parts in the actual circuit. The incoming synchronizing signal 91 consists of pulses with a separation time identified at E which in operation determines the separation time B of the output pulse 101, since B will be an integral multiple of E.

From the foregoing description it will be readily seen that there has been produced a device as substantially fulfills the objects of the invention as set forth herein.

While this specification sets forth in detail the present and preferred construction of this invention, still in practice such deviations from such detail may be resorted to as do not form a departure from the spirit of the invention as defined in the appended claim.

Having thus described the invention, what is claimed as new and useful and is desired to be secured by Letters Patent is:

A multiple pulse generator for producing output pulse groups at a controlled repetition time, wherein the width, spacing, and quantity of pulses within each group are selectively variable, comprising: a pair of multivibrators each including an electron tube, and a separate double triode electron tube; a variable resistance connected between the plate-grid circuit of the first multivibrator tube and ground for controlling the repetition time, a second variable resistance between the plate-grid circuit of the second multivibrator tube and ground for controlling the pulse spacing, a third variable resistance between the cathode circuit of the first multivibrator tube and ground for controlling the quantity of pulses in each said group, a fourth variable resistance between the cathode circuit of said second multivibrator tube and ground for controlling the pulse width, a fourth resistance between the output plate circuit of each multivibrator tube and ground for controlling the pulse width, a fourth variable resistance between the output plate circuit of each multivibrator tube and ground for controlling the amplitude of said pulses, the input grid of said separate electron tube inserted in circuit between said fourth resistance and said plate circuit, the plate of said input triode section connected to the grid of the output triode section of said separate electron tube, whereby the output pulse groups appear at the cathode of the output triode section of said separate electron tube.

References Cited in the file of this patent

UNITED STATES PATENTS

| | | |
|---|---|---|
| 2,442,770 | Kenyon | June 8, 1948 |
| 2,508,895 | Shepard | May 23, 1950 |
| 2,553,284 | Sunstein | May 15, 1951 |
| 2,559,661 | Reeves | July 10, 1951 |
| 2,607,896 | Chambers | Aug. 19, 1952 |
| 2,662,116 | Potier | Dec. 8, 1953 |